United States Patent [19]

Kim

[11] Patent Number: 5,574,261
[45] Date of Patent: Nov. 12, 1996

[54] CIRCUIT FOR PRECISELY MEASURING THE LOAD OF COOKING FOOD IN MICROWAVE OVEN

[75] Inventor: Jong T. Kim, Suwon, Rep. of Korea

[73] Assignee: Samsung Electro-Mechanics Co., Ltd., Suwon, Rep. of Korea

[21] Appl. No.: 164,253

[22] Filed: Dec. 7, 1993

[30] Foreign Application Priority Data

Dec. 9, 1992 [KR] Rep. of Korea .................. 92-23696

[51] Int. Cl.$^6$ .................. G01G 19/00; H05B 6/50
[52] U.S. Cl. ............. 177/245; 177/210 R; 219/708
[58] Field of Search ......................... 219/518, 708; 177/245, 210 R

[56] References Cited

U.S. PATENT DOCUMENTS

| 4,117,898 | 10/1978 | Moriyama | 177/165 |
| 4,683,967 | 8/1987 | Hanatani et al. | 177/144 |
| 5,300,736 | 4/1994 | Ehrhardt | 177/145 |

FOREIGN PATENT DOCUMENTS

| 63-135723 | 6/1988 | Japan | 219/708 |
| 5-001819 | 1/1993 | Japan | 219/518 |

*Primary Examiner*—Brian W. Brown
*Assistant Examiner*—Randy W. Gibson
*Attorney, Agent, or Firm*—Webb Ziesenheim Bruening Logsdon Orkin & Hanson P.C.

[57] ABSTRACT

The invention discloses a circuit for precisely measuring the weight of the cooking food in a microwave oven. The circuit is capable of reducing the variation of the weight-voltage converted value due to the existence of the tray during the measurement of the weight of the cooking stuff. The circuit includes: a piezo-electric sensor for generating a sinusoidal wave each time each of rollers passes the pressing plate of said sensor; a filtering section for shaping the weight-voltage converted sinusoidal wave of said piezo-electric sensor; an amplifying section for amplifying the weight-voltage converted sinusoidal wave output of said filtering section to above the maximum recognizable voltage Vmax of a microprocessor; a rectifying section for charging or discharging the weight-voltage converted sinusoidal wave output of said amplifying section; and a buffer section for supplying to said microprocessor the weight-voltage converted output having a corrected gradient as a result of adding an adder voltage (−V1) as much as the minimum recognizable voltage Vmin of said microprocessor to the weight-voltage converted gradient of said rectifying section.

2 Claims, 4 Drawing Sheets

CIRCUIT FOR PRECISELY MEASURING THE LOAD OF COOKING FOOD IN MICROWAVE OVEN

FIELD OF THE INVENTION

The present invention relates to a circuit for sensing the weight of the cooking food under the automatic cooking mode in a microwave oven. In particular, the present invention relates to a circuit for precisely measuring the load of the cooking food in a microwave oven, in which the control voltage can be precisely outputted in accordance with the variation of the weight of the cooking food by precisely measuring the actual weight of the cooking stuff.

BACKGROUND OF THE INVENTION

Generally, when measuring the weight of the cooking stuff in a microwave oven, a piezo-electric sensor is used.

The piezo-electric sensor is made of a ceramic material which is capable of converting a mechanical energy to an electric energy, and vice versa. In this weight sensor, electric charges are generated proportionately to the applied pressure, which is defined by Q=ΔP×d, where ΔP represents the variation of pressure, d the piezo-electric constant, and Q the amount of charges.

FIG. 1 illustrates the structure of the piezo-electric sensor for detecting the weight of the cooking stuff in a microwave oven. A motor 12 is installed in such a manner that a rectangular driving shaft 13 of the motor 12 should be projected above a bottom 11 of a microwave oven 10. Further, a tray 17 is mounted on the rectangular driving shaft 13 by fitting the tip of the rectangular shaft 13 into a rectangular slot 18 which is formed at the center of the tray 17.

Between the tray 17 and the bottom 11, there is installed an annular support 15 having rollers 16, and a piezo-electric sensor 14 is installed on the track along which the rollers 15 of the annular support 15 move.

Thus, with a cooking stuff placed on the tray 17, if the cooking or unfreezing mode is selected to activate the microwave oven 10, the tray 17 is rotated by the driving motor 12. Together with the tray 17 which is rotated by the motor shaft 13, the rollers 16 of the annular support 15 make rolling movements, with the result that the piezo-electric sensor 14 is pressed down, and that the weight of the cooking stuff is sensed by the piezo-electric sensor 14 in the form of a charge component.

Under this condition, the charge Q which is generated by the variation of the pressure is defined as follows:

$$\Delta P = k \times (m+M) \times g \times \sin\Theta$$

where m represents the mass of the tray, M the mass of the cooking stuff, g the gravitational acceleration, and k a constant.

Accordingly, the generated charges are as follows:

$$Q = k' \times (m+M) \times g \times \sin\Theta \times d$$

where k' represents a constant.

Thus M and Q come to have a proportional relationship, and therefore, the weight can be measured by detecting the amount of charges.

However, an A/D converter of a microprocessor which is used in a microwave oven has a limit in the measurable voltage. Therefore, there is required a dual-sensor circuit in which the amount of charges generated by the piezo-electric sensor is converted to a voltage so as for the microprocessor to recognize it, and in the case of an overload, the generation of an over voltage has to be suppressed to protect the microprocessor.

FIG. 2 illustrates a weight sensing signal processing circuit. As shown in this drawing, the amount of charges which is sensed by the piezo-electric sensor 14 is supplied to a filtering section 20 which consists of resistors R1–R2 and a capacitor C1.

The sinusoidal waves which are generated by the piezo-electric device are liable to be deformed by the vibrations of the structure. In accordance with the capacity of the piezo-electric device, i.e., based on Q=V×C (where C is the capacity), a high voltage difference of over several scores of volts is resulted. Therefore, the filtering section 20 modulates the deformed waves into the normal sinusoidal waves, and lowers the variation value of the voltage to several volts so that the circuit should be able to easily perform controls. The weight sensing signals which have passed through the filtering section 20 are inputted into an amplifying section 21 which consists of resistors R3 and R4 and an operational amplifier OP1.

The amplifying section 21 amplifies the signals which have been filtered and stepped down at the prior stage. Further, the amplifying section 21 adjusts the gradient between the mass of the cooking stuff and the output voltage (input voltage of the microprocessor). Under this condition, the adjustment is made such that the microprocessor should output its highest recognizable voltage at the highest measurable weight.

The output of the amplifying section 21 is inputted into a rectifying section 22 which includes a diode D1 and a capacitor C1.

The signals which have passed through the amplifying terminal become a sinusoidal wave having a period corresponding to the revolution speed of the rollers. Thus, if the microprocessor is capable of recognizing the magnitude of this sinusoidal wave, and is capable of converting it to a weight value, then no more processing is required. However, it is a technically difficult to make the microprocessor recognize the sinusoidal wave, and therefore, the complicatedness of the processing circuit is accompanied.

The rectifying section 22 adopts a hold circuit which divides the sinusoidal wave into half waves across the ground (0 V), and charges them again (integrate) to convert them into a dc voltage. Thus, the A/D converter of the microprocessor is made to recognize not a sinusoidal wave but a dc voltage, thereby converting it into a weight value.

Here, the diode D1 not only divides the sinusoidal wave into half waves, but also prevents the reverse flow of the integrated charges to the capacitor C2.

The output of the rectifying section is inputted into a buffer section 23 which includes an operational amplifier OP2 and a zener diode ZD1.

The charges which are charged at the prior stage is converted into a dc voltage based on the relation V=Q/C. Although it is a very short period of time, during the time when the sinusoidal waves are charged, the voltage is not stabilized. Therefore, in order to achieve a more precise measuring of the weight, it is desirable that the voltage is read after a certain period of time (about 0.1 seconds) from the time of the generation of the sinusoidal waves to the time of converting it into the weight value. This is for taking into account the charging time of the sinusoidal wave. However, there is another problem, that is, the charges are discharged due to the impedance between the two electrodes of the capacitor C2, and this discharge causes a dissipation of the voltage in a log scale.

The buffer section 23 is installed for inhibiting the dissipation of the charges due to the low impedance of the input terminal of the microprocessor. The higher the input impedance of the buffer section 23 is, the larger the impedance between the two electrodes of the capacitor C2 is. Therefore the voltage step-down is reduced, so that the errors can be reduced during the weight measurement. Meanwhile, the zener diode ZD1 protects the microprocessor by preventing the input of an over-voltage into the microprocessor during the over-loading of the cooking stuff. A reset section 24 which includes a transistor Q1 supplies reset signals to the rectifying section 22.

The rollers of the microwave oven is provided in a plurality (usually 3) for the sake of the mechanical stability. The weight of the cooking stuff is distributed to the rollers during the revolutions. Therefore, in order to carry out a precise measuring, it is desirable that the measurements are carried out as many times as the number of the rollers, and the weight is calculated out by taking the average weight.

In carrying out the measurements many times, the reset section 24 discharges the capacitor C2 of the rectifying section 22 each time the measurement is made, and thus the reset section 24 serves as a switch.

However, in such a conventional circuit, the microprocessor cannot fully utilize the recognizable range in the proportional relation between the mass of the cooking stuff and the output voltage due to the existence of the mass of the tray as shown in FIG. 3. The reason is that the origins (0,0) of the voltage V and the mass of the cooking stuff g do not correspond with each other due to the influence of the mass of the tray.

For example, it is assumed that the A/D converter of the microprocessor recognizes 255 ($2^8$–1) steps, and, with this 255 steps, have a proportional decimal range of recognizing 0–5 V. Then the relation between the voltage and the weight of the cooking stuff in relation with the mass of the tray is as shown in Table 1 below.

Theoretically, in the mass value of the tray in the conventional circuit, if the weight of the tray is taken to be 0 g, then its influence is completely eliminated (because 0 times a real number is 0), and therefore, the voltage differential per g can be enlarged by adjusting the amplification ratio of the amplifying section 21. Practically, however, cooking without a container is inconceivable in a microwave oven, and therefore, a mechanical improvement cannot be expected. Further, the influence of the mass of the tray is increased proportionately to the capacity of the tray, and therefore, this factor constitutes an impediment in enlarging the capacity of the microwave oven.

SUMMARY OF THE INVENTION

The present invention is intended to overcome the above described disadvantages of the conventional techniques.

Therefore it is the object of the present invention to provide a circuit for measuring the weight of the cooking food in a microwave oven, in which the automatic cooking controls can be more precisely carried out by utilizing the total input voltage band which is accepted by an A/D converter of the microwave oven under an automatic cooking mode.

BRIEF DESCRIPTION OF THE DRAWINGS

The above object and other advantages of the present invention will become more apparent by describing in detail the preferred embodiment of the present invention with reference to the attached drawings in which.

TABLE 1

| | Conventional Relation between voltage and weight of cooking stuff | | | | | | |
|---|---|---|---|---|---|---|---|
| | Mass of food | | | | | | Vltg diffntl/g |
| Mass of tray | 0 g | | 1500 g | | Utlzbl range | | Vmax − Vmin |
| (m) | Dec | Vltg | Dec | Vltg | Vmin | Vmax | 1500 |
| Model 1  800 g | 180 | −1.471V | 0 | −5V | −1.471V | −5V | −0.0023527V |
| Model 2 1200 g | 160 | −1.863V | 0 | −5V | −1.863V | −5V | −0.0020913V |

Remarks:
*It is designed that a weight of the cooking stuff of 0–1500 g can be measured.
*By using 8-bit data, a division is made into 255 steps ($2^8$ −1) from the maximum voltage value to the minimum voltage value.
*A recognizable voltage range of 0–5V is assumed.

Thus in order to improve the precision of the measurement of the weight of the cooking stuff, the voltage differential per g has to be improved, so that the microprocessor should be able to recognize even a small variation of the weight. In order to improve such performance, the influence of the tray which affects the proportional relation of the voltage and weight has to be minimized.

Figure 5:
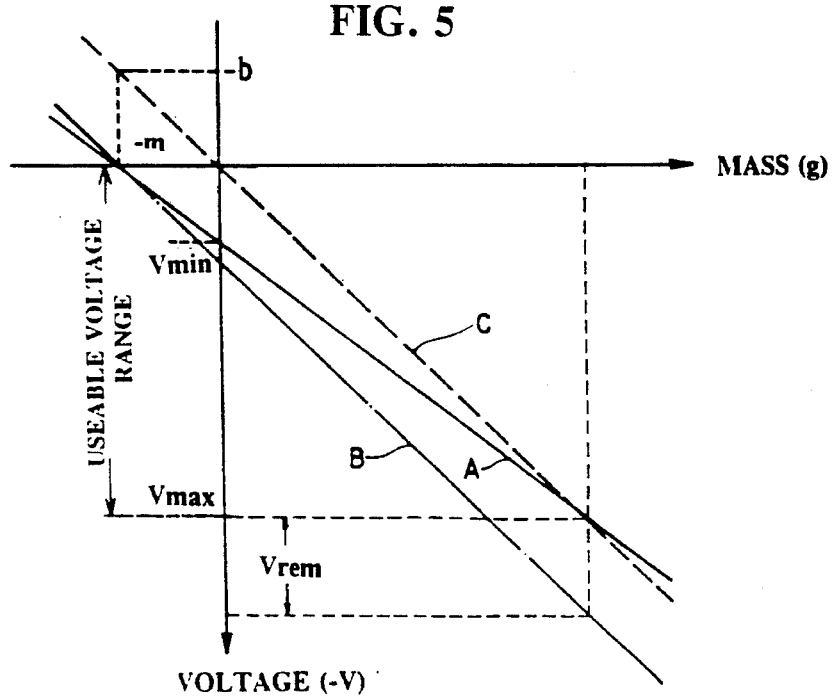
Figure 6:
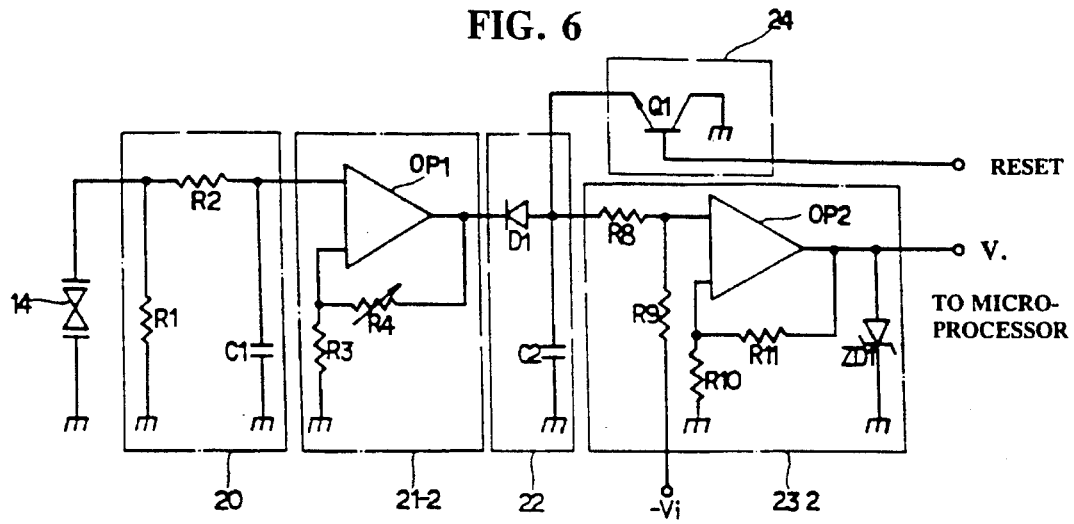
Figure 7:
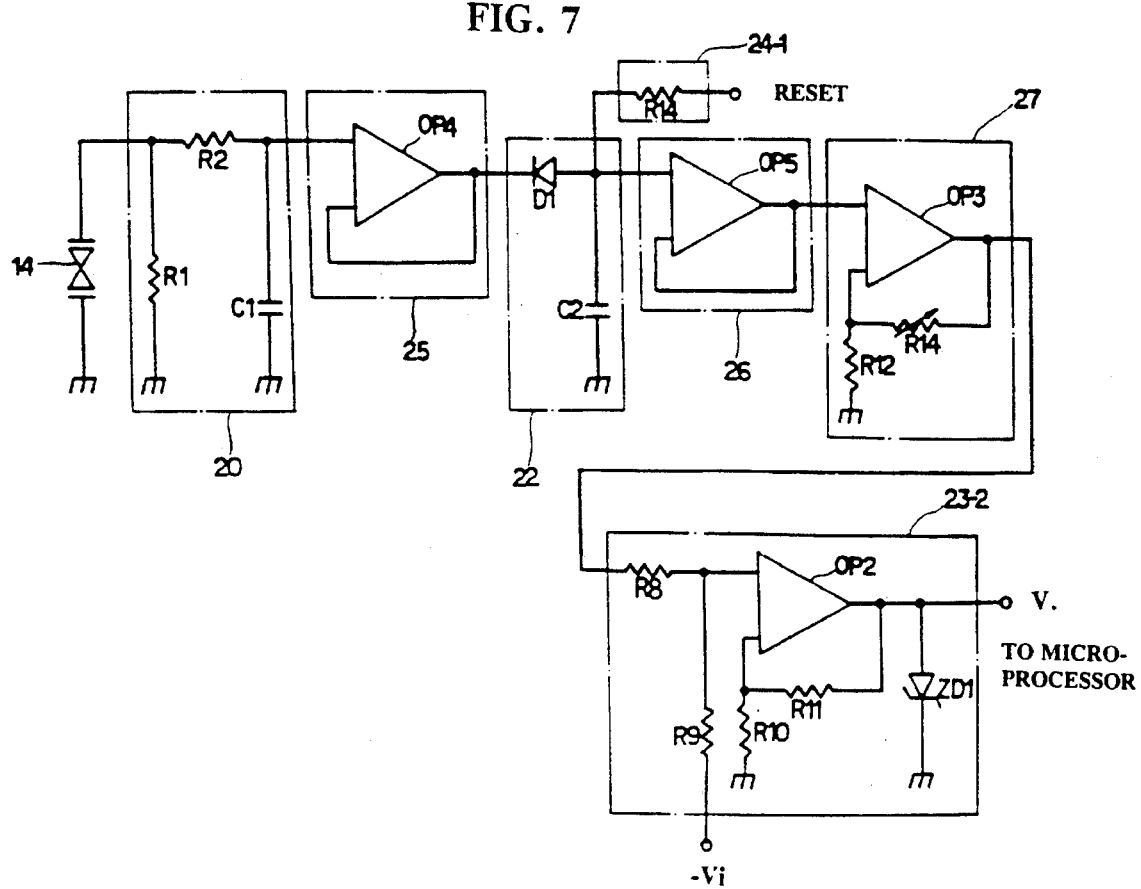

FIG. 5 is a graphical illustration showing the weight-voltage characteristics of the circuit according to the present invention;

FIG. 6 illustrates the constitution of another embodiment of the circuit for measuring the weight of cooking stuff according to the present invention; and FIG. 7 illustrates the constitution of still another embodiment of the circuit for measuring the weight of cooking stuff according to the present invention.

DESCRIPTION OF THE PREFERRED EMBODIMENTS

Figure 4:
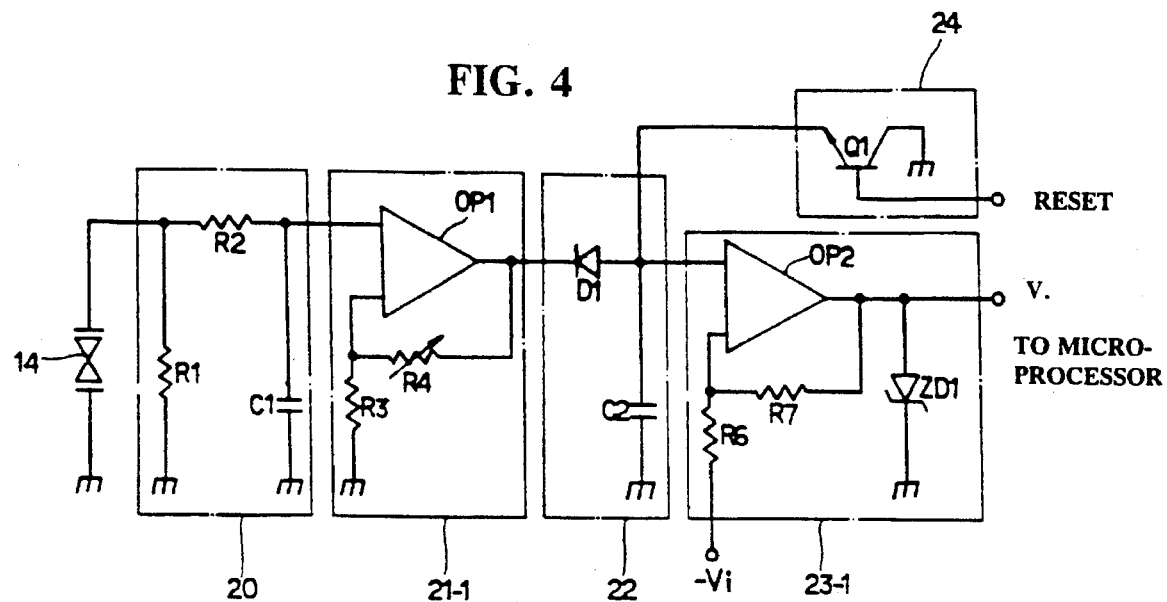
FIG. 4 illustrates the constitution of the circuit for measuring the weight of cooking stuff according to the present invention.

FIG. 4 illustrates the constitution of the circuit according to the present invention. As shown in this drawing, the food weight-converted charges which are detected by a piezo-electric sensor 14 pass through a filtering section 20 to be amplified by a high ratio amplifying section 21-1. The output of the high ratio amplifying section 21-1 is supplied through a rectifying section 22 to a buffer section 23-1, while the rectifying section 22 receives reset signals from a reset section 24.

Figure 1:
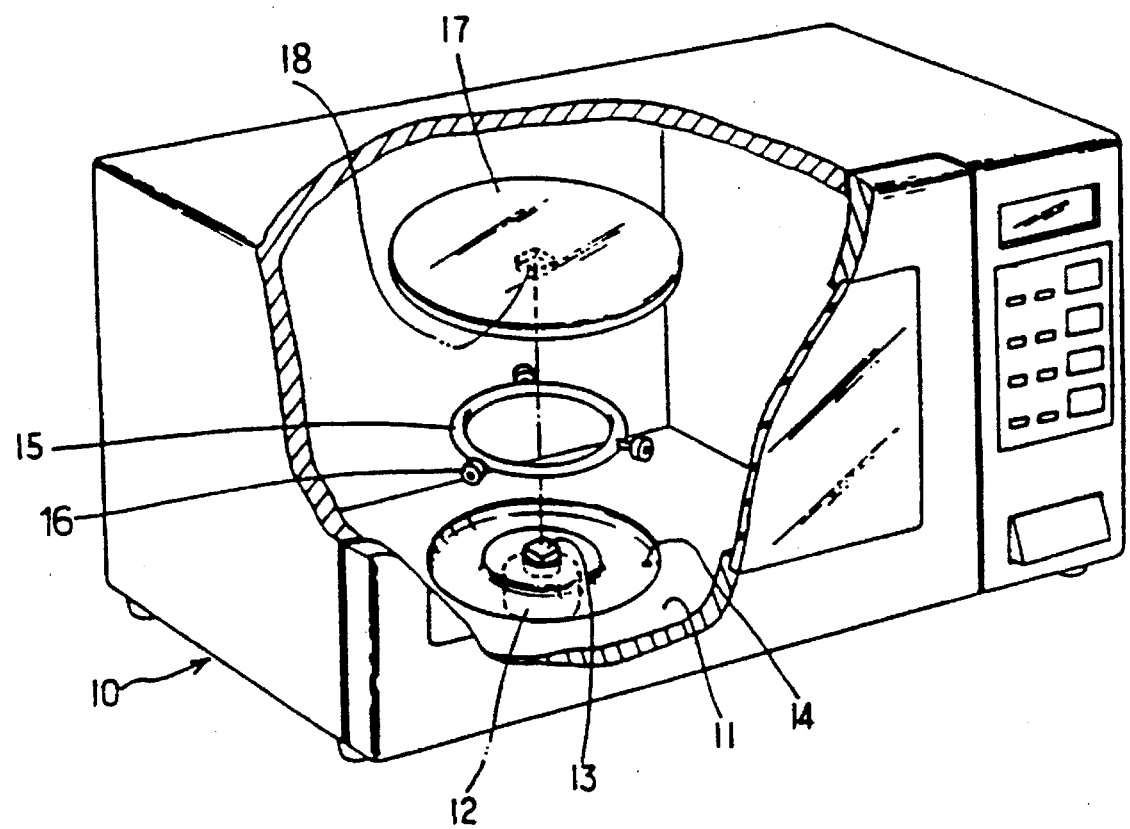
FIG. 1 is a partly cut-out perspective view showing the internal structure of a microwave oven.
Figure 2:
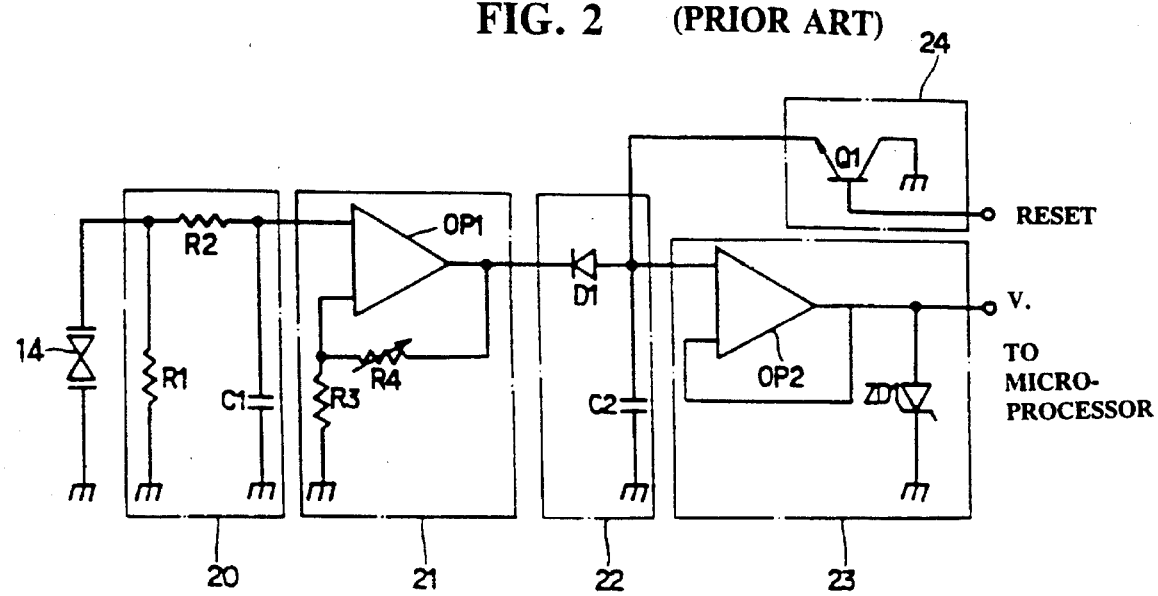
FIG. 2 illustrates the constitution of the conventional circuit for measuring the weight of cooking stuff.
Figure 3:
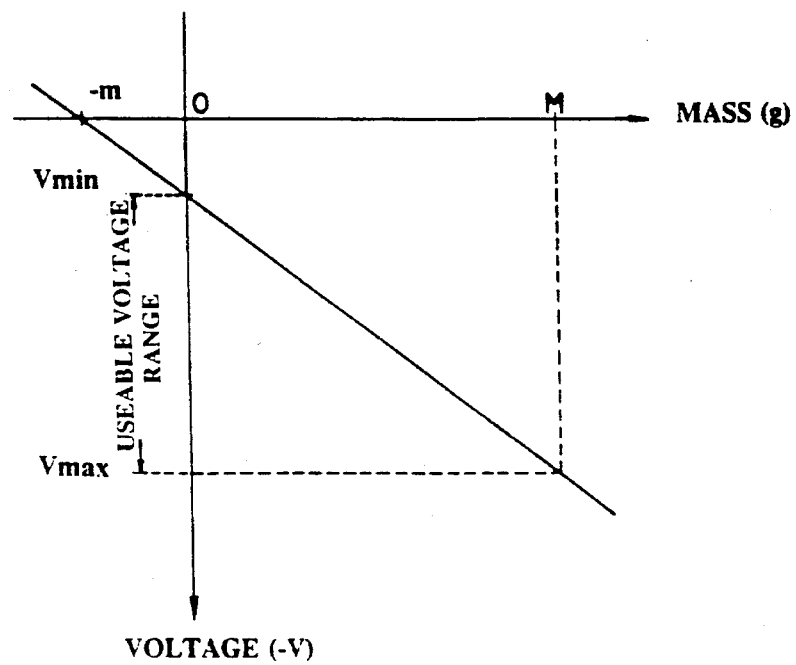
FIG. 3 is a graphical illustration showing the weight-voltage characteristics of the circuit of FIG. 2.

The piezo-electric sensor 14, the filtering section 20, the rectifying section 22 and the reset section 24, which are described above, are assigned with the same reference codes as those of the conventional circuit of FIG. 2. Further, their constitutions and functions are also same.

Unlike the conventional buffer section, the buffer section 23-1 of the present invention receives an adder voltage −V1 through an operational amplifier OP2 and resistors R6 and R7.

The high ratio amplifying section 21-1 has the same constitution as that of the conventional one, but it is adjusted to a high amplifying ratio to increase the voltage differential (gradient) per g of cooking stuff. This high ratio amplifying section 21-1 is adjusted such that the maximum recognition voltage is outputted at the maximum weight in accordance with the weight sensor. Further, it performs the function of correcting the deviations such as mechanical errors and circuital errors. Therefore, the circuit in which the adjustment is completed is fixed in the amplifying ratio, so that it can be treated as a constant. Accordingly, a first order equation is formed for the voltage and weight as follows.

$$Vo = a \times M + b$$

where a represents the voltage differential per g, and b a constant for removing the initial Vmin. As a method for increasing the voltage differential (gradient), the amplifying ratio is increased. The unutilized voltage (residue voltage) which is generated under this condition is parallel shifted as much as −b for correcting the voltage of the circuit. Then an almost ideal relation between the voltage and the weight can be established.

That is, in FIG. 4, a variable resistor R4 of the high ratio amplifying section 21-1 is utilized to increase the amplifying ratio. Thus, a gradient A for the voltage and weight is raised to a gradient B in FIG. 5. Then, in order to remove a residue voltage Vrem which is caused by the amplifying ratio of the amplifying section 21-1 and by the tray, the voltage gradient of the output of the buffer section 23-1 is parallel moved. In order to forcibly move the residue voltage Vrem, an adder voltage (−12 V) is supplied through the resistors R6 and R7 to the operational amplifier OP2. Accordingly, the gradient between the voltage and the weight is corrected as shown by C in FIG. 5, and therefore, the weight sensing voltage utilization range is expanded into usable voltage range. That is, there is solved the problem of the reduction of weight sensing voltage utilization range, which is caused by the mass of the tray.

For example, it is assumed that the A/D converter of the microprocessor of the microwave oven recognizes 255 ($2^8$−1) steps, and has a proportional type decimal range of recognizing 0–5 V with the 255 steps. Under this assumption, Table 2 below contains the test results for the voltage versus weight according to the present invention.

TABLE 2

| | Experiment for weight versus voltage (present invention) | | | | | | Vltg dfftl/g |
|---|---|---|---|---|---|---|---|
| | Food mass | | | | | | |
| | 0 g | | 1500 g | | Utlztn vltg rng | | Vmax − Vmin |
| Tray mass (m) | Dec | Vltg | Dec | Vltg | Vmin | Vmax | 1500 |
| Model 1 800 g | 227 | −0.549V | 0 | −5V | −0.549V | −5V | −0.0029673V |
| Model 2 1200 g | 205 | −0.980V | 0 | −5V | −0.980V | −5V | −0.0026800V |

Remarks:
*Designed such that the cooking food weight of 0–1500 g can be measured.
*By utilizing 8-bit data, a division is made into 255 ($2^8$ −1) steps from the minimum weight to the maximum weight.
*Had a recognition voltage range of 0–5V.

In the above example, when deciding the moving value of the gradient of the weight-voltage, the ideal relation is formed not by parallel moving the gradient to a sufficient degree. The Vmin is made to approach the ground level, but not the exact ground level (0 V), by taking into account the removal of the tray during the use of the microwave oven by users, and the error detection during the production of the microwave oven.

As can be confirmed in Table 2 above, the voltage differential per g during the conversion of the weight-voltage is increased to a large degree compared with the voltage differential per g of Table 1.

This brings the result that the sensitivity is increased and the measurement error is decreased.

Meanwhile, in order to parallel moving the residue voltage Vrem exceeding the Vmax due to the high ratio amplification, an adder voltage is supplied to the buffer section. The adder voltage is based on a voltage subtraction method or a voltage addition method.

The method of FIG. 4 is the voltage subtraction method, and FIG. 6 shows the voltage addition method. The adder voltage −V1 which is supplied to the operational amplifier OP2 of the buffer section is inputted commonly with the output of the rectifying section 22.

Resistors R10 and R11 increase the output impedance for preventing the loss of charges, while resistors R8 and R9 are for the inputs of the output voltage of the rectifying section and the adder voltage.

The voltage subtraction method is applied when the reference voltage (adder voltage) during the voltage moving is used as a non-positive voltage of −12 V, while the voltage addition method is applied when the voltage is changed from the non-positive voltage to a positive voltage of +5 V.

It is assumed that the voltage of the positive input terminal of the operational amplifier OP2 is indicated by V1, and the voltage of its negative input terminal is indicated by V2. Then, voltage subtraction method: Vo=(V1−V2)×k voltage addition method: Vo=(V1+V2)×k where k represents a constant.

FIG. 7 illustrates still another embodiment of the circuit of the present invention. Referring to this drawing, an operational amplifier OP4 of a buffer section 25 is disposed between the filter section 20 and the rectifying section 22. Further, an amplifying section 27 is provided at the front of a buffer section 23-2 which consists of an adder of the voltage addition method. Further, a buffer section 26 is provided between the rectifying section 22 and the amplifying section 27.

In this embodiment, the high ratio amplifying section 27 is installed at the rear of the rectifying section 22, and a buffer section 25 is installed in place of the amplifying section which has been disposed at the front of the rectifying section 22.

In the case where the weight-converted charges of the piezo-electric sensor 14 which has passed through the filtering section 20 is directly voltage-amplified, the input voltage for the amplifying section is a sinusoidal wave which is generated upon the collision between the rollers and the pressing plate of the piezo-electric sensor. This can be expressed by a time function of the revolution cycle of the rollers. Therefore, even if the amplifying ratio is adjusted by means of the variable resistor, it does not mean the amplification of the stationary voltage. Therefore, the confirmation of the voltage amplification ratio is impossible during the adjustment, but is possible only during the inputting of the next set of the signals (i.e., during the collision between the rollers and the pressing plate of the piezo-electric sensor), this being the otherwise unnecessary wasting of time.

However, in the case of FIG. 7, the adjustment of the amplifying ratio of the sensed charges is carried out just after the rectifying section 22. This is not the amplification of the sinusoidal wave which is a time function, but an amplification of an absolute value of a dc voltage in which the conception of time has disappeared. Accordingly, the voltage of the output terminal Vo of the buffer section 23-2 can be confirmed simultaneously with the adjustment of the amplification ratio of the amplifying section 27.

According to the present invention as described above, the actual utilization range of the cooking stuff sensed voltage which is sensed by the piezo-electric sensor of the microwave oven can be expanded, so that the setting of an exact cooking mode should be possible. Further, in achieving the above fact, the parallel movement of the voltage gradient can be adjusted in an easy manner.

What is claimed is:

1. A circuit for precisely measuring the weight of the cooking food in a microwave oven, said circuit comprising:

a piezo-electric sensor for generating a sinusoidal wave each time each of a plurality of rollers in said microwave oven passes a pressing plate of said sensor;

a filtering section for shaping the weight-voltage converted sinusoidal wave of said piezo-electric sensor;

an amplifying section for amplifying the weight-voltage converted sinusoidal wave output of said filtering section to a level above a maximum recognizable voltage Vmax of a microprocessor;

a rectifying section for charging or discharging the weight-voltage converted sinusoidal wave output of said amplifying section; and a buffer section having a voltage adding and subtracting operational amplifier for supplying to said microprocessor the weight-voltage converted output having a corrected gradient as a result of adding to or subtracting from the weight-voltage converted gradient of said rectifying section, and by means of said operational amplifier, an adder voltage (−V1) having a value as much as a minimum recognizable voltage Vmin of said microprocessor.

2. A circuit for precisely measuring the weight of the cooking food in a microwave oven, said circuit comprising:

a piezo-electric sensor for generating a sinusoidal wave each time each of a plurality of rollers in said microwave oven passes a pressing plate of said sensor;

a filtering section for shaping the weight-voltage converted sinusoidal wave output of said piezo-electric sensor;

a rectifying section for charging or discharging the weight-voltage converted sinusoidal wave output of said filtering section;

an adjustable amplifying section having a variable resistor which is adjustable so as to amplify the weight-voltage converted sinusoidal wave output of said rectifying section to above the maximum recognizable voltage Vmax of a microprocessor; and a buffer section having a voltage adding and subtracting operational amplifier for supplying to said microprocessor the weight-voltage converted output having a corrected gradient as a result of adding to or subtracting from the weight-voltage converted gradient of said amplifying section, and by means of said operational amplifier, an adder voltage (−V1) having a value as much as a minimum recognizable voltage Vmin of said microprocessor, and wherein the voltage Vo of an output terminal of the buffer section can be confirmed simultaneously with an adjustment to the amplification ratio of the amplifying section.

\* \* \* \* \*